United States Patent
Yoshikawa

(10) Patent No.: US 9,217,834 B2
(45) Date of Patent: Dec. 22, 2015

(54) OPTICAL DEVICE, METHOD OF MANUFACTURING OPTICAL DEVICE, AND OPTICAL DEVICE ASSEMBLY METHOD

(71) Applicant: Sumitomo Electric Industries, Ltd., Osaka-shi (JP)

(72) Inventor: Satoshi Yoshikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/940,029

(22) Filed: Jul. 11, 2013

(65) Prior Publication Data
US 2014/0023329 A1     Jan. 23, 2014

(30) Foreign Application Priority Data

Jul. 13, 2012  (JP) ................. 2012-157840
Jul. 13, 2012  (JP) ................. 2012-157855
Jun. 21, 2013  (JP) ................. 2013-130672

(51) Int. Cl.
*G02B 6/42* (2006.01)
*G02B 6/35* (2006.01)
*G02B 6/293* (2006.01)

(52) U.S. Cl.
CPC *G02B 6/42* (2013.01); *G02B 6/356* (2013.01); *G02B 6/3512* (2013.01); *G02B 6/2931* (2013.01); *Y10T 29/49128* (2015.01)

(58) Field of Classification Search
CPC ...... G02B 6/3518; G02B 6/3532; G02B 6/42; G02B 6/3512; G02B 6/356; G02B 6/2931; Y10T 29/49128
USPC ................................. 385/92; 29/831
See application file for complete search history.

(56) References Cited

U.S. PATENT DOCUMENTS

| 5,178,357 A | * | 1/1993 | Platus .................. 248/619 |
| 2003/0231841 A1 | * | 12/2003 | Nakanishi et al. ............ 385/92 |
| 2011/0103797 A1 | * | 5/2011 | Oki et al. ................. 398/79 |

FOREIGN PATENT DOCUMENTS

| CN | 101458365 A |   | 6/2009 |
| EP | 2071377 A1 | * | 6/2009 |
| JP | 2000111584 A | * | 4/2000 |
| JP | 2004-020973 A |   | 1/2004 |
| JP | 2006234142 A | * | 9/2006 |
| JP | 2009-145887 A |   | 7/2009 |
| JP | 2012-008562 A |   | 1/2012 |
| JP | 2012008562 A | * | 1/2012 |

OTHER PUBLICATIONS

Notification of the First Office Action in Chinese Application No. 201310301819.7 dated Apr. 14, 2015.

* cited by examiner

*Primary Examiner* — Peter Radkowski
(74) *Attorney, Agent, or Firm* — Venable LLP; Michael A. Sartori; F. Brock Riggs

(57) ABSTRACT

An optical device includes an optical base, an electric board, a fiber tray, and the like, which are placed in an enclosure. In particular, the electric board is made smaller than the optical base, and the fiber tray is placed in a space defined between an outer peripheral surface of the electric board and an inner side surface of the enclosure. In other word, the optical device uses a gap between the electric board and the enclosure not as a dead space but as a space for routing a remaining portion of the optical fiber. Thus, the optical device can improve space efficiency and thereby can reduce its size.

12 Claims, 13 Drawing Sheets

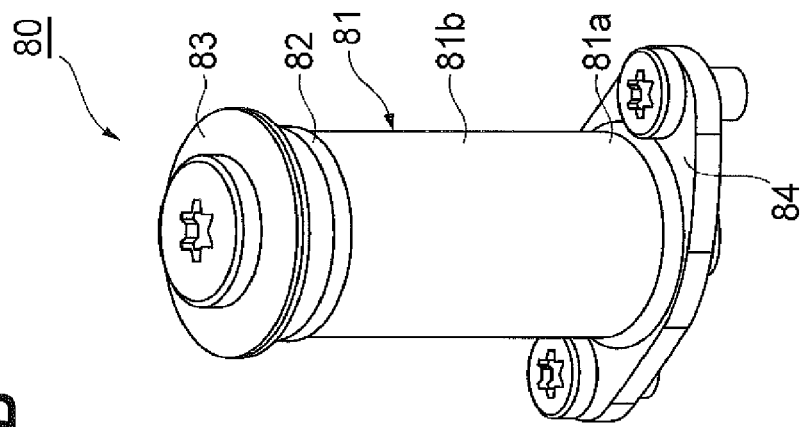
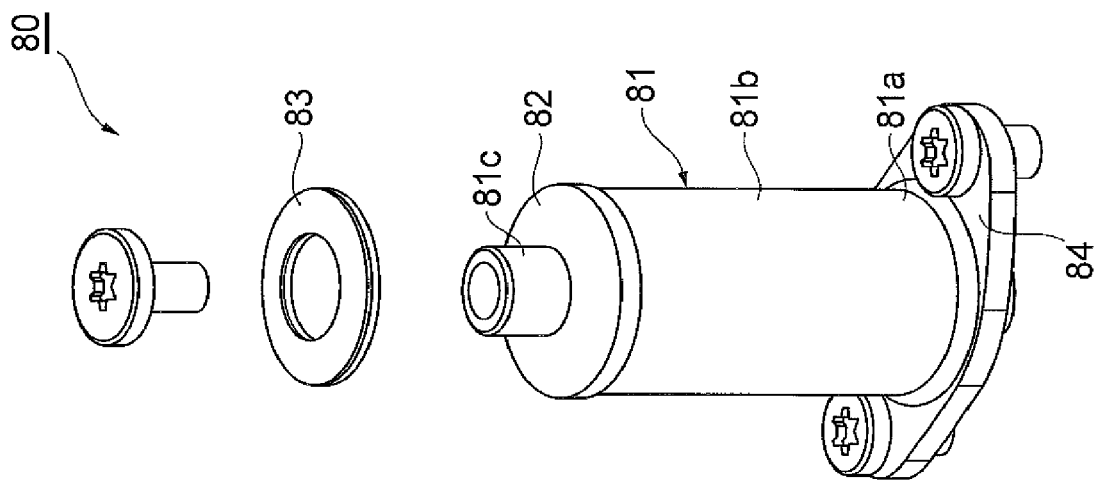
Fig.7A
Fig.7B

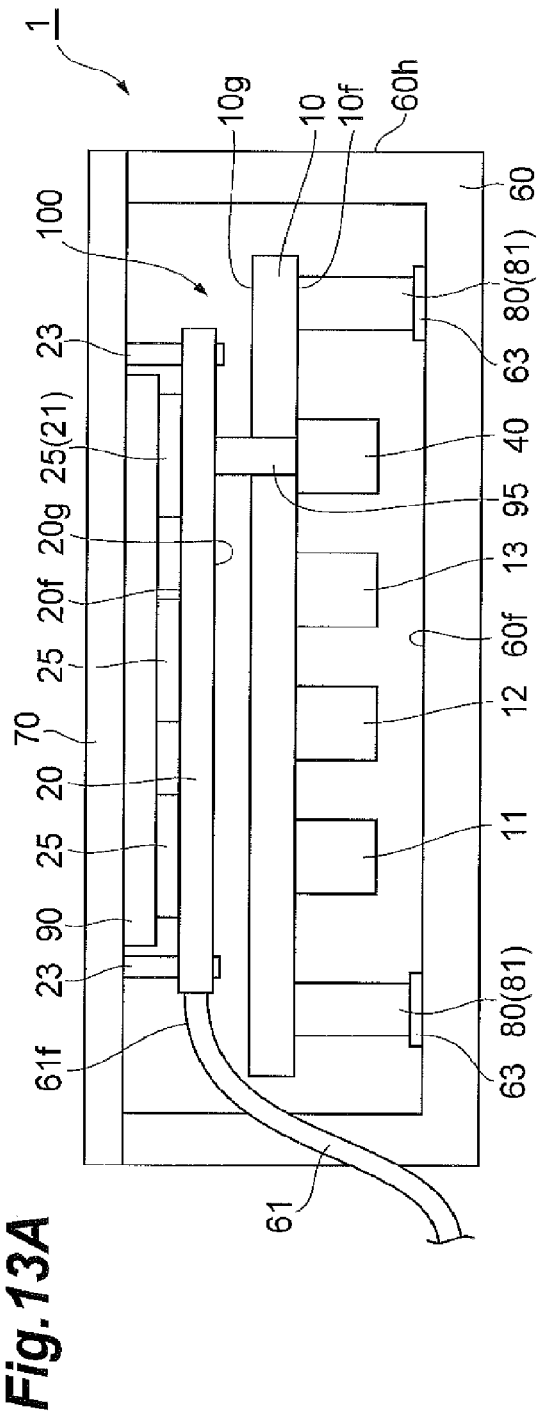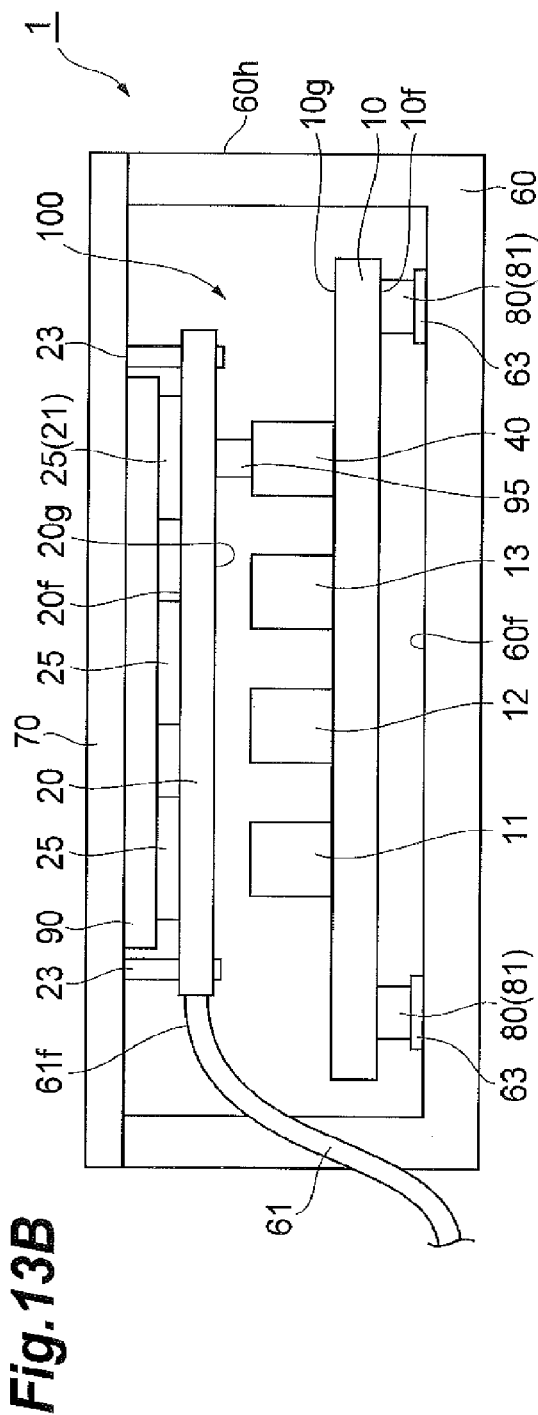

OPTICAL DEVICE, METHOD OF MANUFACTURING OPTICAL DEVICE, AND OPTICAL DEVICE ASSEMBLY METHOD

RELATED APPLICATION

Priority is claimed to Japanese Patent Application No. 2012-157840, filed Jul. 13, 2012, Japanese Patent Application No. 2012-157855, filed Jul. 13, 2012, and Japanese Patent Application No 2013-130672, filed Jun. 21, 2013, the entire content of each of which is incorporated herein by reference.

TECHNICAL FIELD

The present invention relates to an optical device, a method of manufacturing the optical device, and an optical device assembly method.

BACKGROUND

Japanese Patent Laid-Open No. 2009-145887 discloses a multi-port wavelength switch module. This multi-port wavelength switch module includes a multilayer ceramic base mounting an electronic component thereon; an optical bench mounting an optical component such as a diffraction grating; a MEMS array bonded to the multilayer ceramic base; an enclosure placing them therein; and a fiber feedthrough for introducing a plurality of optical fibers into the enclosure. Note that the optical fibers introduced into the enclosure are optically connected to the optical component mounted on the optical bench.

SUMMARY

By the way, an optical apparatus as described above is currently required to reduce its size. In order to reduce the size, it is necessary to improve space efficiency in the enclosure by reducing dead space in the enclosure. However, the multi-port wavelength switch module disclosed in Japanese Patent Laid-Open No. 2009-145887 does not include detailed studies from this perspective.

The present invention has been made in view of such circumstances, and an object of the present invention is to provide an optical device capable of reducing its size by improving space efficiency and a method of manufacturing the optical device.

Meanwhile, in the multi-port wavelength switch module disclosed in Japanese Patent Laid-Open No. 2009-145887, the enclosure is formed by soldering side walls to the multilayer ceramic base. In other word, in this multi-port wavelength switch module, the multilayer ceramic base forms a bottom surface of the enclosure. The optical bench is directly disposed on the bottom surface of the enclosure. Thus, in this multi-port wavelength switch module, a vibration applied to the enclosure is directly transmitted to the optical bench mounting the optical component thereon, thus causing a problem of vibration resistance.

The present invention has been made in view of such circumstances, and an object of the present invention is to provide an optical device capable of improving vibration resistance and an optical device assembly method.

An aspect of the present invention relates to an optical device. This optical device includes: an optical unit having an optical base mounting an optical component on a front surface thereof and an electric board disposed on the front surface side of the optical base or a rear surface side of the optical base and mounting an electronic component thereon; an enclosure placing the optical unit therein; a plurality of fixing member fixing the electric board to the optical base or the enclosure; and a pillar extending from the enclosure to the optical base for supporting the optical base to the enclosure so as to cause the optical base and the enclosure to be spaced apart from each other.

The present invention will be more fully understood from the detailed description given herein below and the accompanying drawings, which are given by way of illustration only and are not to be considered as limiting the present invention.

Further, scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

BRIEF DESCRIPTION OF THE DRAWINGS

FIG. 7A and FIG. 7B are perspective views illustrating a configuration of a pillar illustrated in FIG. 1;

FIG. 13A and FIG. 13B are schematic cross-sectional views illustrating a configuration of an optical device according to a modification.

DETAILED DESCRIPTION

Explanation of the Embodiment

Figure 1:
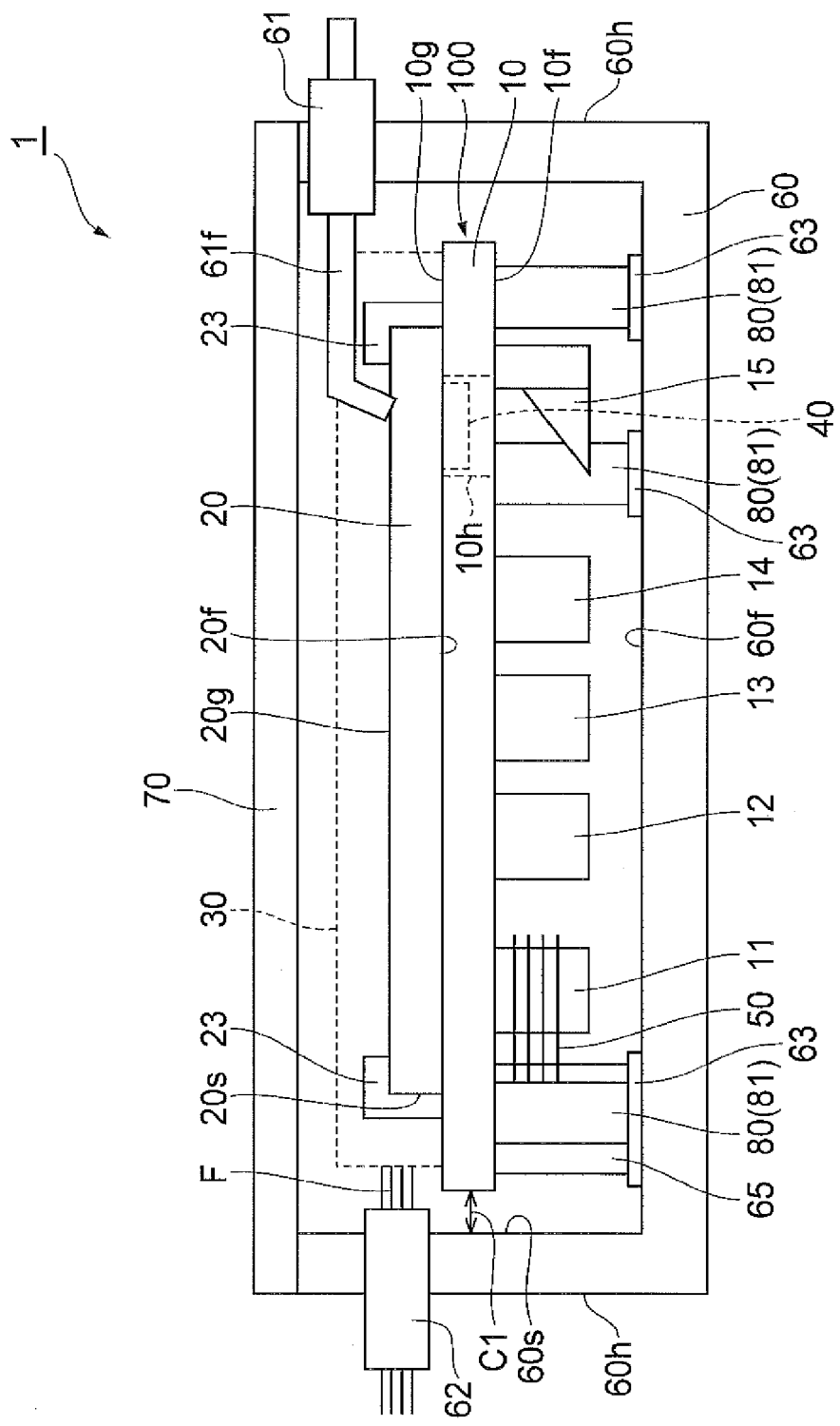
FIG. 1 is a schematic cross-sectional view illustrating a configuration of an optical device according to the present embodiment.

Firstly, the contents of the embodiment of the present invention will be listed and explained below.

An aspect of the present invention relates to an optical device. This optical device includes: an optical unit having an optical base mounting an optical component on a front surface thereof and an electric board disposed on the front surface side of the optical base or a rear surface side of the optical base and mounting an electronic component thereon; an enclosure placing the optical unit therein; a plurality of fixing member fixing the electric board to the optical base or the enclosure; and a pillar extending from the enclosure to the optical base for supporting the optical base to the enclosure so as to cause the optical base and the enclosure to be spaced apart from each other.

In this optical device, the optical base is supported by and spaced apart from the enclosure. Thus, the optical component can be placed in a space between the optical base and the enclosure, which can improve space efficiency and thereby can reduce its size.

Also, in this optical device, the optical base mounting the optical component thereon is spaced apart from the enclosure by the pillar. Thus, even if a vibration is applied to the enclosure, the vibration is not directly transmitted to the optical base mounting the optical component thereon. Therefore, this optical device improves vibration resistance.

in the optical device according to an aspect of the present invention, the optical base may be placed in the enclosure so as to cause the front surface of the optical base to face a bottom surface side of the enclosure. In this case, the optical component is disposed closer to the bottom side of the enclosure than the optical base, which can prevent dust from being deposited on the optical component.

The optical device according to an aspect of the present invention may further includes a fiber tray placing a plurality of optical fibers optically connected to the optical component therein, wherein when viewed from a predetermined direction along a thickness direction of the optical base and the electric board, one of the optical base and the electric board may be smaller than the other; and the fiber tray may be disposed in a space defined by an outer peripheral surface of one of the optical base and the electric board, whichever is smaller, and an inner surface of the enclosure. In this case, a gap between one of the optical base and the electric board, whichever is smaller, and the enclosure is used not as a dead space but as a space for routing a remaining portion of the optical fiber. Therefore, the optical device can further improve space efficiency.

In the optical device according to an aspect of the present invention, if a height of the optical component in the predetermined direction is higher than the height of the electronic component, the optical base may be larger than the electric board; and if the height of the electronic component in the predetermined direction is higher than the height of the optical component, the electric board may be larger than the optical base. In this manner, a board mounting a relatively taller component is made larger than a board mounting a relatively shorter component, which can further reduce dead space in the enclosure and thereby improve space efficiency.

In the optical device according to an aspect of the present invention the plurality of optical fibers may include an input port for introducing light into the enclosure and an output port for outputting light from the enclosure; the optical component may include a collimator array that collimates light inputted from the input port and emits light; the electronic component may include a light deflection element that receives light emitted from the collimator array and emits light to the output port, and a drive circuit for driving the light deflection element; the light deflection element may be placed in a frame body; the fixing member may fix the electric board and the optical base to each other; and the frame body may be fixed to the optical base and the electric board to thereby form one of the fixing member. Since the light deflection element is a relatively large component, it may be difficult to place the fixing member in a portion mounting the light deflection element thereon. However, in this optical device, the frame body placing the light deflection element is configured as the fixing member fixing the optical base and the electric board. Thus, the fixing member is placed in a portion on which the light deflection element is mounted, which can stably fix the optical base and the electric board.

In the optical device according to an aspect of the present invention, the fiber tray may include an opening for drawing the plurality of optical fibers from the front surface side of the optical base to the rear surface side of the optical base. In this case, for example, if the front surface of the optical base faces the bottom surface side of the enclosure, an external optical fiber introduced into the rear surface side of the optical base can be easily connected to the optical fiber by drawing the optical fiber from the opening of the fiber tray.

In the optical device according to an aspect of the present invention, the optical base and the electric board may have a substantially rectangular plate shape; the fixing member may be arranged in four corners of the optical base and the electric board for fixing the electric board and the optical base to each other; and the pillar may support the optical base to the enclosure in at least three portions of the portions in which the fixing member is placed on the optical base. In this case, the enclosure and the optical base as well as the optical base and the electric board are stably fixed to each other, thus improving reliability against vibration or the like applied from outside.

Another aspect of the present invention relates to a method of manufacturing an optical device. This method of manufacturing an optical device is a method of manufacturing the aforementioned optical device, the method comprising: a first step of forming the optical unit by fixing the optical base and the electric board to each other by the fixing member; a second step of attaching the pillar to the enclosure; and a third step of placing the optical unit in the enclosure and fixing the optical unit to the enclosure by supporting the optical base to the enclosure by the pillar. This method can improve space efficiency and thereby can manufacture the optical device capable of reducing its size.

The method of manufacturing an optical device according to another aspect of the present invention is a method of manufacturing the aforementioned optical device, the method comprising: a first step of forming the optical unit by fixing the optical base and the electric board to each other by the fixing member; a second step of attaching the pillar to the enclosure; a third step of placing the optical unit in the enclosure and fixing the optical unit to the enclosure by supporting the optical base to the enclosure by the pillar; a fourth step of fusion-splicing an external optical fiber introduced from a fiber feedthrough provided in the enclosure to the enclosure and the plurality of optical fibers to each other following the third step; and a fifth step of placing the plurality of optical fibers and the external optical fiber in the fiber tray placed in the enclosure. This method can further improve space efficiency and thereby can manufacture the optical device capable of reliably reducing its size.

In the optical device according to an aspect of the present invention, the pillar may have one end portion fixed to the enclosure and the other end portion fixed to the optical base; and the optical base may be held along a direction crossing the front surface in the other end portion of the pillar. In this case, the optical device not only can improve vibration resistance but also can reliably fix the optical base to the pillar and the enclosure.

In the optical device according to an aspect of the present invention, the optical base may be arranged so as to form a first clearance between the optical base and the enclosure in a portion having the smallest distance between the optical base and the enclosure, in a direction along the front surface; the pillar may hold the optical base so as to form a second clearance between the other end portion and the optical base, in a direction along the front surface; and a width of the first clearance in a direction along the front surface may be greater than the width of the second clearance in a direction along the front surface. In this case, even if the position of the optical base in a direction along the front surface of the optical base is changed due to vibration or the like, the amount of variation falls within a range of the second clearance between the optical base and the pillar, which can prevent a contact between the optical base and the enclosure.

In the optical device according to an aspect of the present invention, the optical base may be sandwiched between the first elastic member and the second elastic member attached to the other end portion of the pillar. In this case, the first and second elastic members function as a vibration buffer member, which can further improve vibration resistance.

In the optical device according to an aspect of the present invention, the pillar may be formed in a columnar shape in which a center of the one end portion matches the center of the other end portion. In this case, even if the pillar is rotated around the matched center, the positional relation between the one end portion and the other end portion is not changed, and thus the positional relation between the pillar and the optical base can be easily adjusted at assembly.

In the optical device according to an aspect of the present invention, the first elastic member and the second elastic member may be a disc spring or a rubber washer respectively. In this case, the optical base can be easily held and fixed in a direction crossing the front surface of the optical base in the other end portion of the pillar.

In the optical device according to an aspect of the present invention, the one end portion of the pillar may be fixed to the enclosure through a support piece protrudingly provided on an inner side surface of the enclosure. In this case, the pillar and the enclosure can be easily positioned.

In the optical device according to an aspect of the present invention, a third elastic member may be interposed between the optical base and the other end portion of the pillar in a direction along the front surface. In this case, the variation in the position of the optical base can be suppressed while preventing a vibration from being transmitted from the pillar to the optical base in a direction along the front surface of the optical base.

In the optical device according to an aspect of the present invention, a third elastic member may be interposed between the optical base and the other end portion of the pillar in a direction along the front surface; and the third elastic member may be integrally configured with at least one of the first elastic member and the second elastic member. In this case, the number of components can be reduced.

A further another aspect of the present invention relates to an optical device assembly method. This optical device assembly method is an optical device assembly method of supporting and fixing an optical base mounting an optical component thereon to an enclosure, the method comprising: a first step of fixing one end portion of the pillar to the enclosure; a second step of mounting the optical base on the other end portion of the pillar and placing the optical base in the enclosure; and a third step of fixing the optical base to the pillar in a direction crossing a front surface of the optical base so as to cause the optical base to be spaced apart from the enclosure.

In this optical device assembly method, the optical base mounting the optical component thereon is supported by the pillar and fixed to the enclosure in a state being spaced apart from the enclosure. Thus, this optical device assembly method can provide an optical unit improving vibration resistance by suppressing a vibration applied to the enclosure from being directly transmitted to the optical base.

In the optical device assembly method according to the further another aspect of the present invention, in the third step, the optical base may be held in a direction crossing the front surface in the other end portion. This optical device assembly method can easily provide an optical device improving vibration resistance by holding the optical base along a direction crossing the front surface of the optical base in the other end portion thereof.

In the optical device assembly method according to the further another aspect of the present invention, in the second step, the optical base may be placed in the enclosure so as to form a first clearance between the optical base and the enclosure in a portion having the smallest distance between the optical base and the enclosure, in a direction along the front surface; in the third step, the pillar may hold the optical base so as to form a second clearance between the other end portion and the optical base, in a direction along the front surface; and a width of the first clearance in a direction along the front surface may be greater than the width of the second clearance in a direction along the surface. This optical device assembly method can provide an optical device with high vibration resistance in a direction along the front surface of the optical base.

Details of the Embodiment

There follows a detailed description of an optical device and a method of manufacturing the optical device (optical device assembly method) according to the present embodiment with reference to the accompanying drawings. Note that in the following drawings, the same reference numerals or characters are assigned to the same or similar elements and the duplicate description is omitted. Note also that the dimensional ratios in the following drawings may be different from the actual dimensional ratios.

Figure 2:
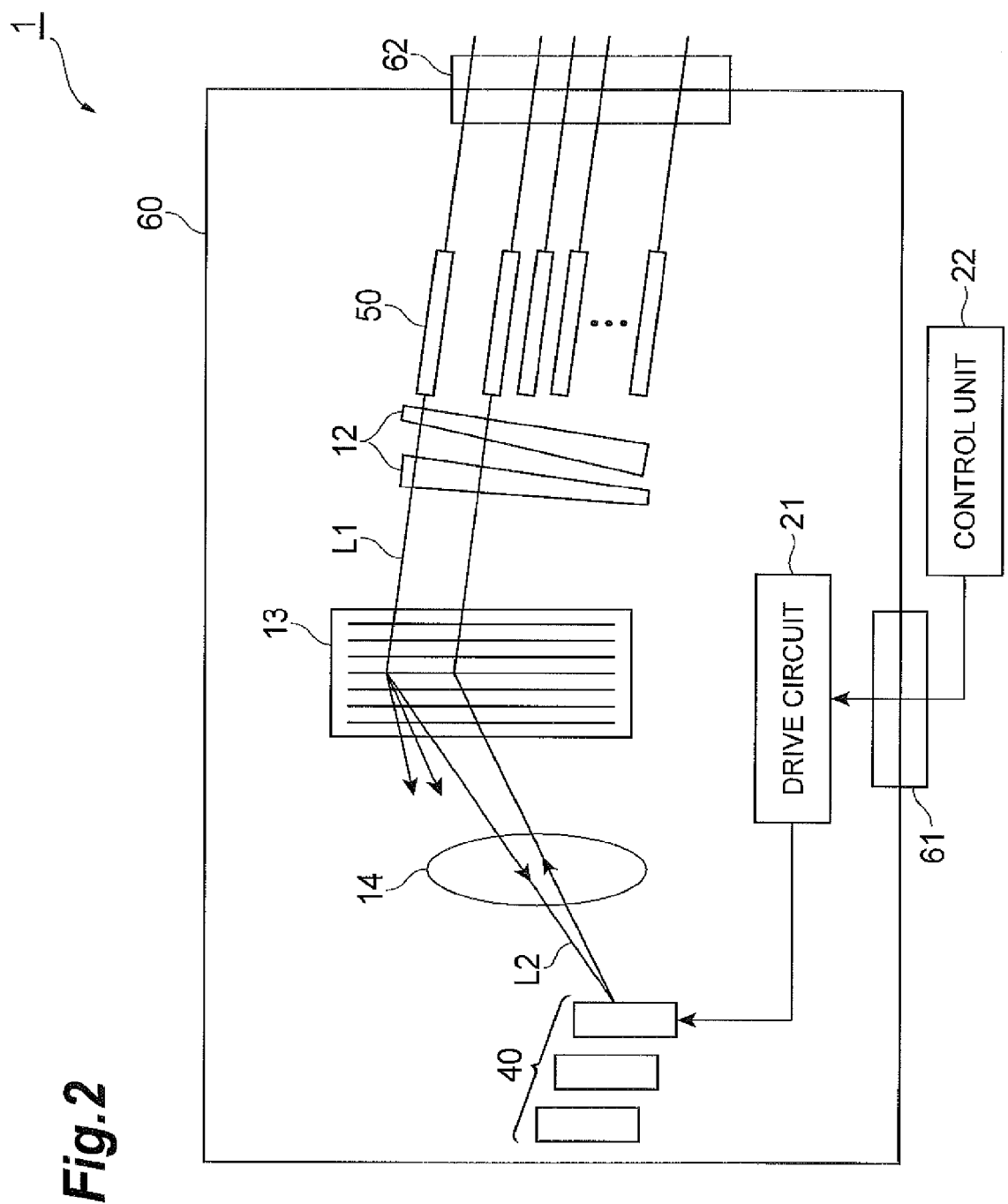
FIG. 2 is a view for describing an operation of the optical device illustrated in FIG. 1.
Figure 3:
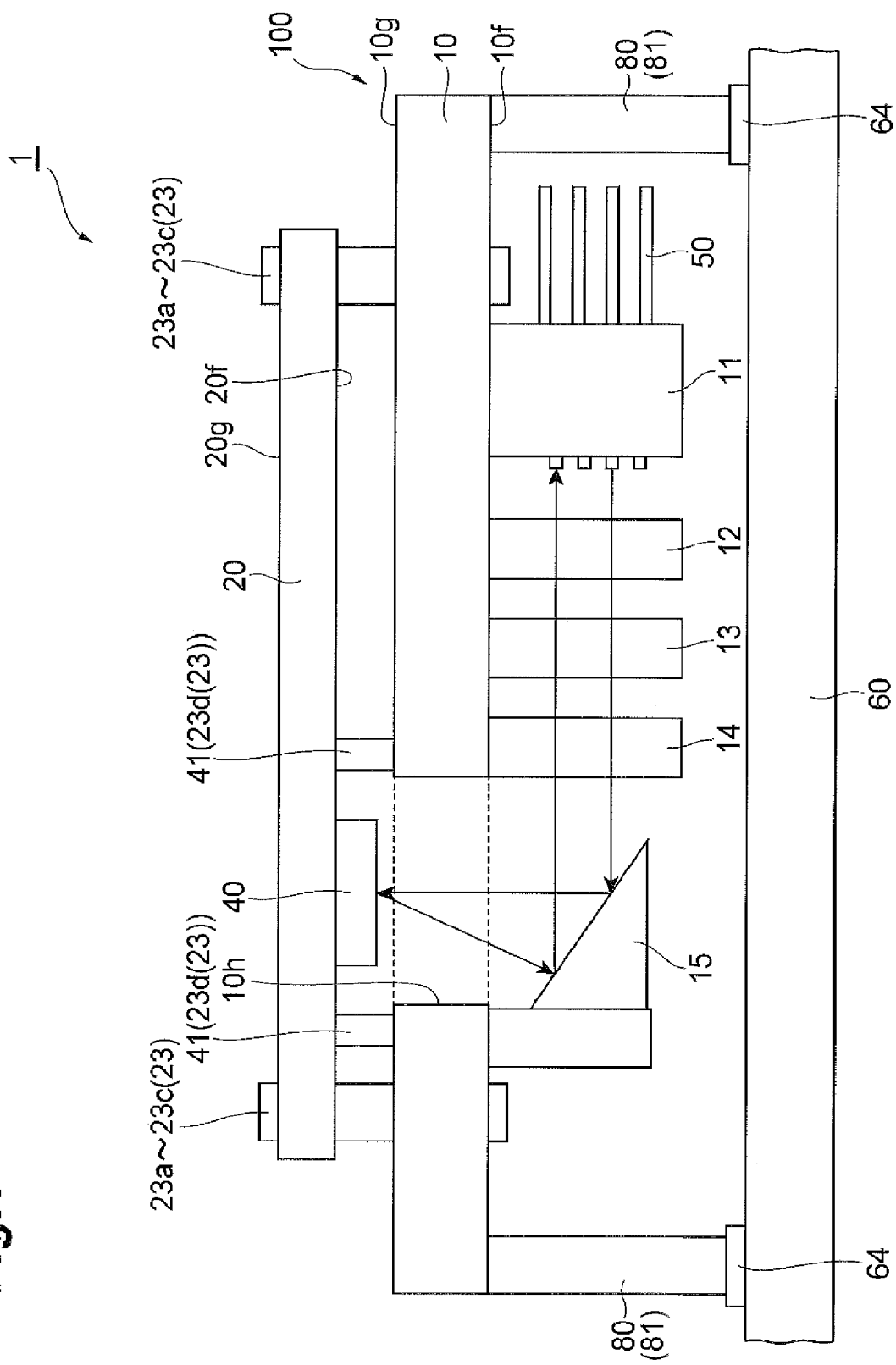
FIG. 3 is a schematic cross-sectional view illustrating an essential part of the optical device illustrated in FIG. 1.
Figure 4:
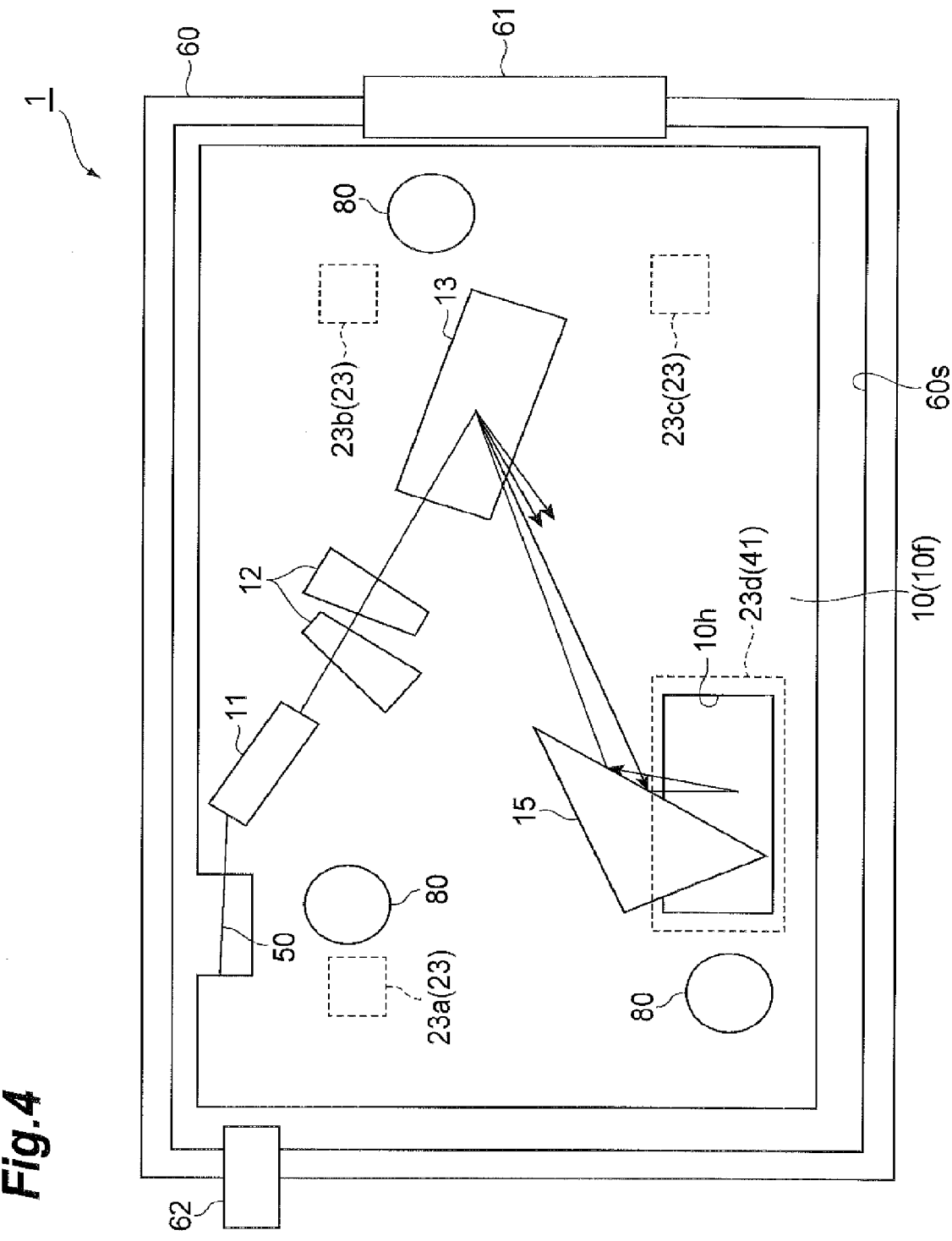
FIG. 4 is a schematic bottom plan view illustrating the optical device illustrated in FIG. 1.
Figure 5:
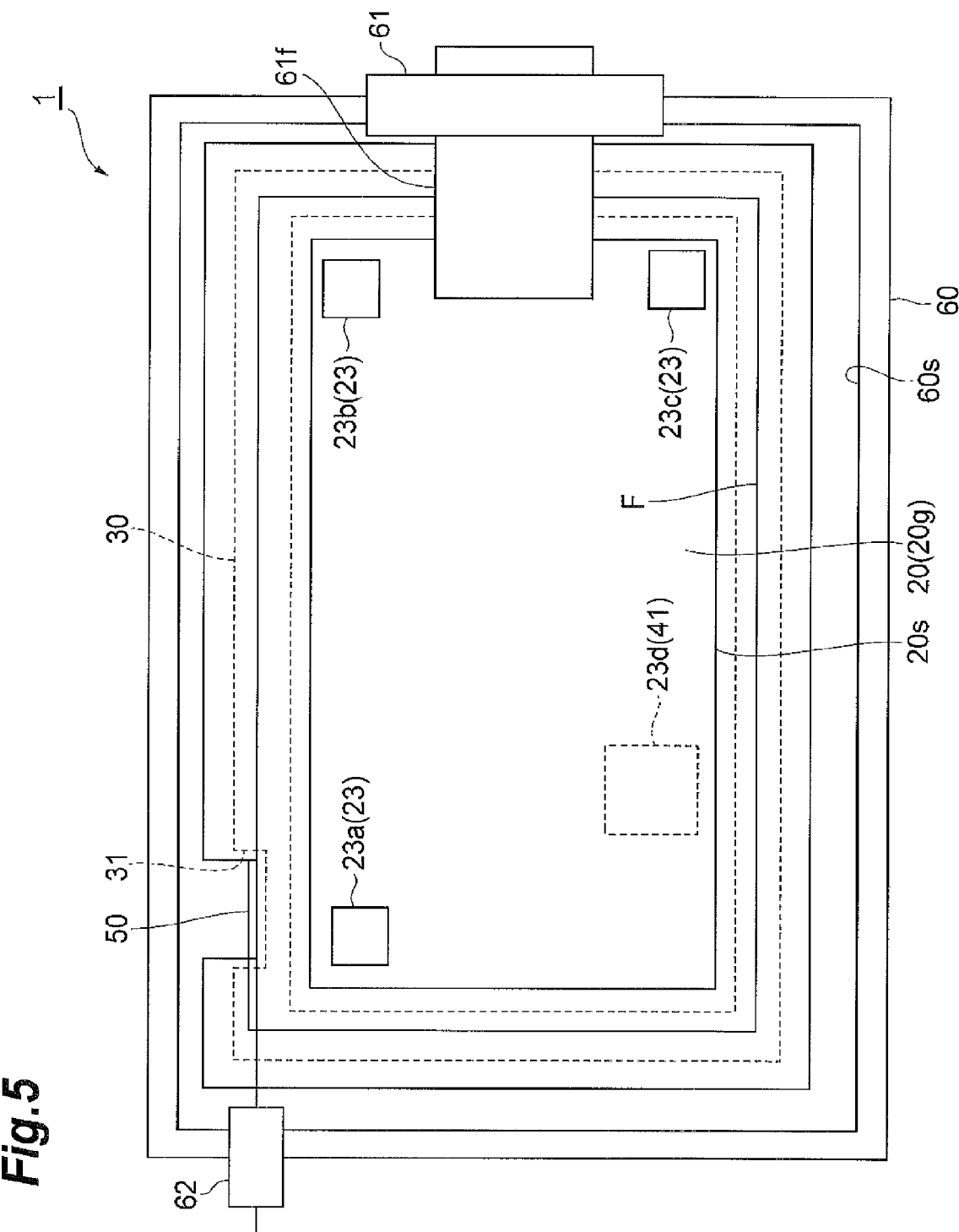
FIG. 5 is a schematic top plan view illustrating the optical device illustrated in FIG. 1.

FIG. 1 is a schematic cross-sectional view illustrating a configuration of the optical device according to the present embodiment. FIG. 2 is a schematic view for describing an operation of the optical device illustrated in FIG. 1. FIG. 3 is a schematic cross-sectional view illustrating an essential part of the optical device illustrated in FIG. 1. FIG. 4 is a schematic bottom plan view illustrating the optical device illustrated in FIG. 1. FIG. 5 is a schematic top plan view illustrating the optical device illustrated in FIG. 1. As illustrated in FIG. 1, an optical device 1 includes an optical base 10, an electric board 20, a fiber tray 30, a MEMS (Micro Electro Mechanical System) mirror (light deflection element) 40 (see FIG. 3), a plurality of optical fibers 50, a rectangular box-shaped enclosure 60 placing them therein, a rectangular plate-shaped lid body 70 (hereinafter the enclosure 60 and the lid body 70 bonded to the enclosure 60 may be collectively referred to as an enclosure 60) sealing the enclosure 60, and a pillar (support body) 80.

Various optical components for implementing the function of the optical device 1 are mounted on a front surface 10f of the optical base 10. The electric board 20 is arranged on a side of a rear surface 10g of the optical base 10. The optical base 10 and the electric board 20 are fixed to each other by fixing member 23 to form an optical unit 100 together with various components mounted on each board. The optical base 10 is supported by a pillar 80 extending from the enclosure 60 so as to be spaced apart from the enclosure 60. In other word, the optical unit 100 is supported by the pillar 80 and fixed relative to the enclosure 60. Since the optical base 10 and the enclosure 60 are supported so as to be spaced apart from each other as described above, the optical unit 100 is less susceptible to outside temperature changes and other effects. In addition, the optical components can be placed in a space between the optical base 10 and the enclosure 60, which improves space efficiency and thereby can reduce the size of the optical unit 100.

There follows a description of an operation of the optical device 1 with reference to FIG. 2. As illustrated in FIG. 2, in the optical device 1, first, wavelength-multiplexed light is inputted from an input port (optical fiber 50). The wavelength-multiplexed light L1 inputted from the input port passes through a beam expander optical system made of a plurality of prisms 12, and therethrough a beam diameter thereof is elliptically expanded. The wavelength-multiplexed light L1 whose beam diameter is expanded by the beam expander optical system is incident on a diffraction grating 13. The wavelength-multiplexed light L1 incident on the diffraction grating 13 is dispersed for each predetermined wavelength component and then is emitted from the diffraction grating 13. Each wavelength component light L2 passing through the diffraction grating 13 undergoes adjustment of an optical path thereof by an unillustrated folding mirror and the like, is condensed by a condenser lens 14, and then is guided to a reflecting surface of the MEMS mirror 40.

Each wavelength component light L2 incident on the reflecting surface of the MEMS mirror 40 is reflected in a direction different for each wavelength component, follows the aforementioned path in reverse, and is outputted from each different output port (optical fiber 50). In other word, the MEMS mirror 40 receives each wavelength component light L2 and emits light to an output port different for each wavelength component. Note that FIG. 2 illustrates predetermined wavelength component light as representative of each wavelength component light L2 from the diffraction grating 13. Thus, the MEMS mirror 40 has a plurality of reflecting surfaces each provided corresponding to each wavelength component light L2 and can switch the optical path independently. The MEMS mirror 40 is electrically connected to and driven by a drive circuit 21 mounted on the electric board 20. The operation of the drive circuit 21 is controlled by a control signal from a control unit 22 electrically connected thereto.

Then, with reference to FIGS. 1 and 3 to 5, the configuration of the optical device 1 will be described. The optical base 10 has a substantially rectangular plate shape and is made of a metal material having a low linear expansion coefficient, or the like. The optical base 10 can be made of a material having a low linear expansion coefficient (such as Invar and Super Invar) so as to prevent the distance between the optical components placed on the optical base 10 from varying due to surrounding temperature changes. For example, the linear expansion coefficient of the optical base 10 is equal to or less than $1 \times 10^{-6}$ (/deg° C.). Meanwhile, the enclosure 60 is made of a lightweight metal material such as aluminum. Thus, the linear expansion coefficient of the optical base 10 and the linear expansion coefficient of the enclosure 60 may be different from each other. Note that the detail of the enclosure 60 will be described later.

The optical components mounted on the optical base 10 include a collimator array 11, a prism 12, a diffraction grating 13, a condenser lens 14, and a folding mirror 15, each arranged in this order on the optical path of light emitted from the optical fiber 50 toward the MEMS mirror 40. The collimator array 11 collimates light inputted from the input port and emits light. Note that an opening 10h is provided on the optical base 10 and the folding mirror 15 is disposed immediately above the opening 10h. Note also that the MEMS mirror 40 is placed in a frame body 41 and is mounted on the electric board 20. The frame body 41 is fixed to the electric board 20 and is preferably bonded and fixed to the rear surface 10g of the optical base 10. In this case, the frame body 41 is fixed to the optical base 10 and the electric board 20 to serve as fixing member 23 (more specifically, a fixture 23d).

Further, the optical base 10 and the electric board 20 are preferably fixed to each other by fixtures 23a to 23c so as to be spaced apart from each other by a predetermined gap corresponding to the thickness of the frame body 41. The fixtures 23a to 23c each are made of a screw retainer and a predetermined spacer for fixing the optical base 10 and the electric board 20. In other word, the fixing member 23 for fixing the optical base 10 and the electric board 20 to each other include the fixtures 23a to 23c and the frame body 41 (fixture 23d).

Such an optical base 10 is placed in the enclosure 60 so that the front surface 10f thereof faces a side of the bottom surface 60f of the enclosure 60. Thus, various optical components mounted on the front surface 10f of the optical base 10 are oriented from the optical base 10 to a side of the bottom surface 60f of the enclosure 60. Thus, this configuration can prevent dust from being deposited on the optical components.

Here, the fixing member 23 is arranged in four corners of the optical base 10 and the electric board 20 each having a substantially rectangular shape. More specifically, as illustrated in FIGS. 4 and 5, the optical base 10 and the electric board 20 are mutually supported and fixed by the fixtures 23a to 23d arranged in four corners thereof. Also, the optical base 10 is supported by the pillar 80 and fixed to the enclosure 60 at least three positions of the positions in which the fixtures 23a to 23d are arranged. The enclosure 60 and the optical base 10 as well as the optical base 10 and the electric board 20 configured in this manner are stably fixed to each other, which increases reliability against vibration and the like applied from outside.

As illustrated in FIG. 3, the fixing member 23 is preferably the fixtures 23a to 23c supporting and fixing the optical base 10 and the electric board 20 to each other so as to be spaced apart from each other by a predetermined gap. Also, at least one of the fixing member 23 is preferably the frame body 41 placing the MEMS mirror 40 therein. Since the MEMS mirror 40 is a relatively large component, it may be difficult to place the fixing member in a portion mounting the MEMS mirror 40 thereon between the optical base 10 and the electric board 20. However, the fixing member can be placed in a portion mounting the MEMS mirror 40 thereon by further fixing the frame body 41 fixed to the electric board 20 to the optical base 10 in order to mount the MEMS mirror 40 on the electric board 20. Thus, this configuration can stably fix the optical base 10 and the electric board 20.

As illustrated in FIGS. 3 and 5, the electric board 20 is placed on the rear surface 10g of the optical base 10. The electric board 20 having a substantially rectangular plate shape includes a front surface 20f and a rear surface 20g. The front surface 20f of the electric board 20 faces a side of the rear surface 10g of the optical base 10. The MEMS mirror 40 is mounted on the front surface 20f of the electric board 20. The position of the electric board 20 on which the MEMS mirror 40 is mounted corresponds to the position of the opening 10h of the optical base 10 and the folding mirror 15.

Various electronic components are mounted on the rear surface 20g of the electric board 20. The examples of the electronic components mounted on the rear surface 20g of the electric board 20 include the drive circuit 21 for driving the MEMS mirror 40. As illustrated in FIGS. 1 and 5, the drive circuit 21 is electrically connected to an electrical connection end 61f introduced through an electrical feed-through 61 provided on the side surface 60h of the enclosure 60. Thus, the MEMS mirror 40 is electrically connected to an external control unit 22 through the electrical feed-through 61.

Here, when viewed from the thickness direction of the optical base 10 and the electric board 20, the electric board 20 is smaller than the optical base 10. Thus, a gap occurs between the outer peripheral surface 20s of the electric board 20 and the inner side surface (inner surface) 60s of the enclosure 60. In particular, the electric board 20 is placed in the enclosure 60 in such a manner that a rectangular annular shaped space is defined between the outer peripheral surface 20s thereof and the inner side surface 60s of the enclosure 60. Then, the fiber tray 30 having a rectangular annular shape is placed in the space. Note that the height of the optical components in the thickness direction of the optical base 10 and the electric board 20 is higher than the height of the electronic components.

As described above, the fiber tray 30 has a rectangular annular shape and is placed in a space defined between the outer peripheral surface 20s of the electric board 20 and the inner side surface 60s of the enclosure 60 on the rear surface 10g of the optical base 10. The fiber tray 30 includes an opening 31. An optical fiber 50 drawn through the opening 31, and an external optical fiber F introduced into the enclosure 60 from a fiber feedthrough 62 provided in the enclosure 60 are placed in the fiber tray 30. Note that a rubber fiber guide may be provided in each corner portion of the fiber tray 30 to prevent the optical fiber coating from being damaged.

The MEMS mirror 40 has a plurality of reflecting surfaces facing the folding mirror 15 provided on the opening 10h of the optical base 10. The MEMS mirror 40 is driven by the drive circuit 21 receiving a control signal from the control unit 22 and reflects light in a desired direction by appropriately changing the tilt angle of a reflecting surface thereof.

One end of each of the plurality of optical fibers 50 is (optically) connected to the collimator array 11 and extends from the collimator array 11 into the fiber tray 30. More specifically, the plurality of optical fibers 50 passes from the collimator array 11 on a side of the front surface 10f of the optical base 10, through the opening 31 of the fiber tray 30, is then drawn to a side of the rear surface 10g of the optical base 10, and then routed into the fiber tray 30. Then, the plurality of optical fibers 50 is fusion-spliced to the external optical fiber F at a predetermined position. Note that one of the plurality of optical fibers 50 is an input port for inputting light to the enclosure 60 and the other is an output port for outputting light from the enclosure 60.

Figure 6:
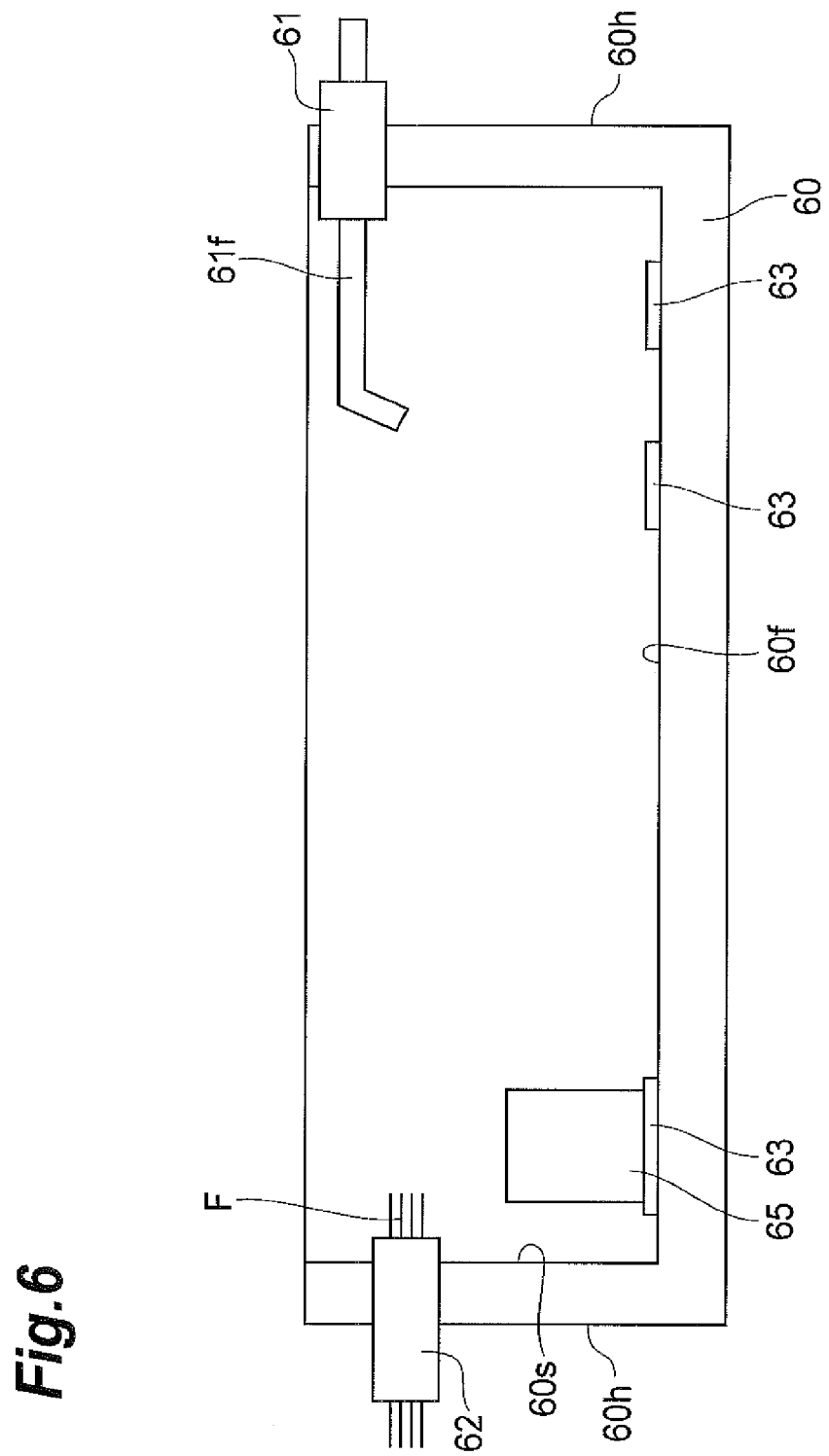
FIG. 6 is a schematic cross-sectional view illustrating a configuration of an enclosure illustrated in FIG. 1.

FIG. 6 is a schematic cross-sectional view illustrating a configuration of the enclosure illustrated in FIG. 1. As illustrated in FIG. 6, the enclosure 60 has a rectangular box shape with one side being opened. As described above, the enclosure 60 includes the electrical feed-through 61 and the fiber feedthrough 62. The electrical feed-through 61 and the fiber feedthrough 62 are provided on a side surface 60h.

In addition, three support pieces 63 are protrudingly provided on the inner side surface 60s of the enclosure 60. A pillar 80 is fixed to each of the support pieces 63 as described later. Further, inside the enclosure 60, a slope 65 for drawing the plurality of optical fibers 50 from a side of the front surface 10f of the optical base 10 to a side of the rear surface 10g thereof is provided so as to be coupled to the opening 31 provided in the fiber tray 30 to be mounted later. The enclosure 60 is hermetically sealed by bonding a lid body 70 thereto, for example, by laser welding and the like.

Figure 8:
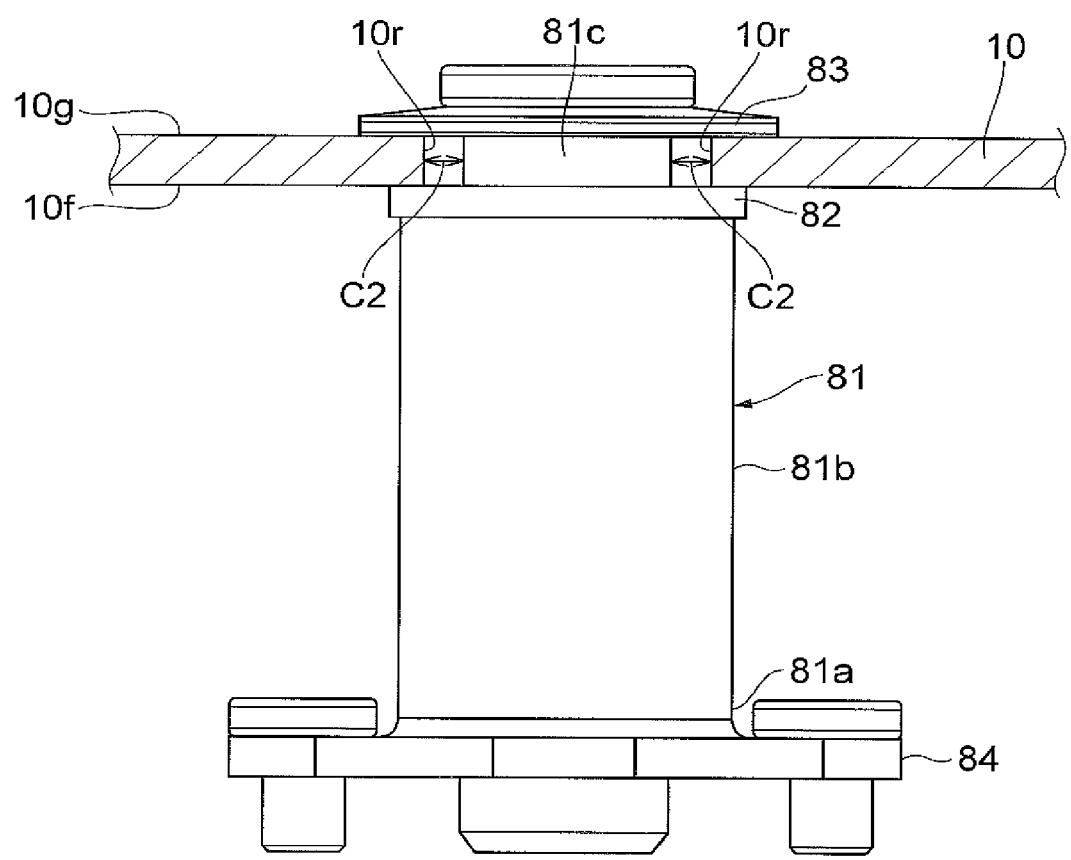
FIG. 8 is a partially cutaway cross-sectional view illustrating a state in which the pillar illustrated in FIG. 1 holds the optical base.

FIG. 7A and FIG. 7B are perspective views illustrating a configuration of the pillar illustrated in FIG. 1. In particular, FIG. 7A is an exploded perspective view of the pillar. FIG. 8 is a partially cutaway cross-sectional view illustrating a state in which the pillar illustrated in FIG. 6 holds the optical base. As illustrated in FIGS. 7A, 7B and 8, each pillar 80 has a cylindrical body member 81 and a pair of members (a first elastic member and a second elastic member) 82 and 83. The body member 81 includes one end portion (that is, one end portion of the pillar 80) 81a, an intermediate portion 81b, and the other end portion (that is, the other end portion of the pillar 80) 81c in the order from a side of the bottom surface 60f of the enclosure 60.

A flange portion 84 screw-fixed to the support piece 63 of the enclosure 60 is protrudingly provided on one end portion 81a of the body member 81. In other word, the one end portion 81a of the body member 81 is fixed to the enclosure 60 through the support piece 63 protrudingly provided from the inner side surface 60s of the enclosure 60 and the flange portion 84. The body member 81 extends in a direction (here, a substantially perpendicular direction) crossing the front surface 10f of the optical base 10 in a state of being fixed to the enclosure 60 (see FIGS. 1 and 6).

The other end portion 81c of the body member 81 has a cylindrical shape with a smaller diameter than the one end portion 81a and the intermediate portion 81b. The optical base 10 is held by the other end portion 81c in a direction crossing the front surface 10f of the optical base 10. Specifically, annular members 82 and 83 are inserted into and attached to the other end portion 81c. Specifically, the annular members 82 and 83 each are preferably an elastic member. More specifically, the member 82, the optical base 10 (hole portion 10r), and the member 83 are inserted into the other end portion 81c in this order. The annular members 82 and 83 are screw-fixed to the other end portion 81c in a state of being inserted into the other end portion 81c. Thereby, the optical base 10 is sandwiched between the member 82 and the member 83 to be supported by and fixed to the enclosure 60.

At this time, the optical base 10 (more specifically, an inner surface of the hole portion 10r of the optical base 10) and the other end portion 81c are spaced apart from each other in a direction along front surface 10f and the rear surface 10g of the optical base 10 (a direction along the bottom surface 60f of the enclosure 60, that is, a surface direction of the optical base 10). In other word, a clearance C2 (second clearance) is provided between the optical base 10 (the inner surface of the hole portion 10r) and the other end portion 81c in a direction along the front surface 10f and the rear surface 10g of the optical base 10. This configuration can prevent a vibration from being transmitted from the pillar 80 to the optical base 10 in a direction along the front surface 10f of the optical base 10.

In particular, this clearance C2 is smaller than a clearance (first clearance) C1 (see FIG. 1) between the optical base 10 and the enclosure 60 in a direction along the front surface 10f of the optical base 10. Thus, even if the position of the optical base 10 is changed due to vibration or the like in a direction along the front surface 10f of the optical base 10, the amount of variation is restricted to a range of the clearance C2, which can prevent a contact between the optical base 10 and the enclosure 60. Note that the example of the clearance C1 includes a clearance formed between the optical base 10 and the enclosure 60 in a portion having the smallest distance between the optical base 10 and the enclosure 60 in a direction along the front surface 10f of the optical base 10. Note also that for example, the member 82 may be a rubber washer and the member 83 may be a disc spring.

Note that the pillar 80 is preferably formed in a columnar shape in which each center of the one end portion 81a, the intermediate portion 81b, and the other end portion 81c is matched with each other. In this configuration, even if the pillar 80 is rotated around the matched center, the positional relation between the one end portion 81a, the intermediate portion 81b, and the other end portion 81c is not changed, and thus the positional relation between the pillar 80 and the optical base 10 can be easily adjusted at assembly. In particular, as illustrated in the present embodiment, the use of a plurality of pillars 80 for supporting the optical base 10 can easily determine the positional relation therebetween and facilitate assembly.

Here, the optical unit 100 includes the optical base 10 mounting optical components thereon and the electric board 20 mounting electronic components thereon. In this optical unit 100, the optical components mounted on the optical base 10 and the electronic components mounted on the electric board 20 may be changed from the above components depending on the application.

Figure 9:
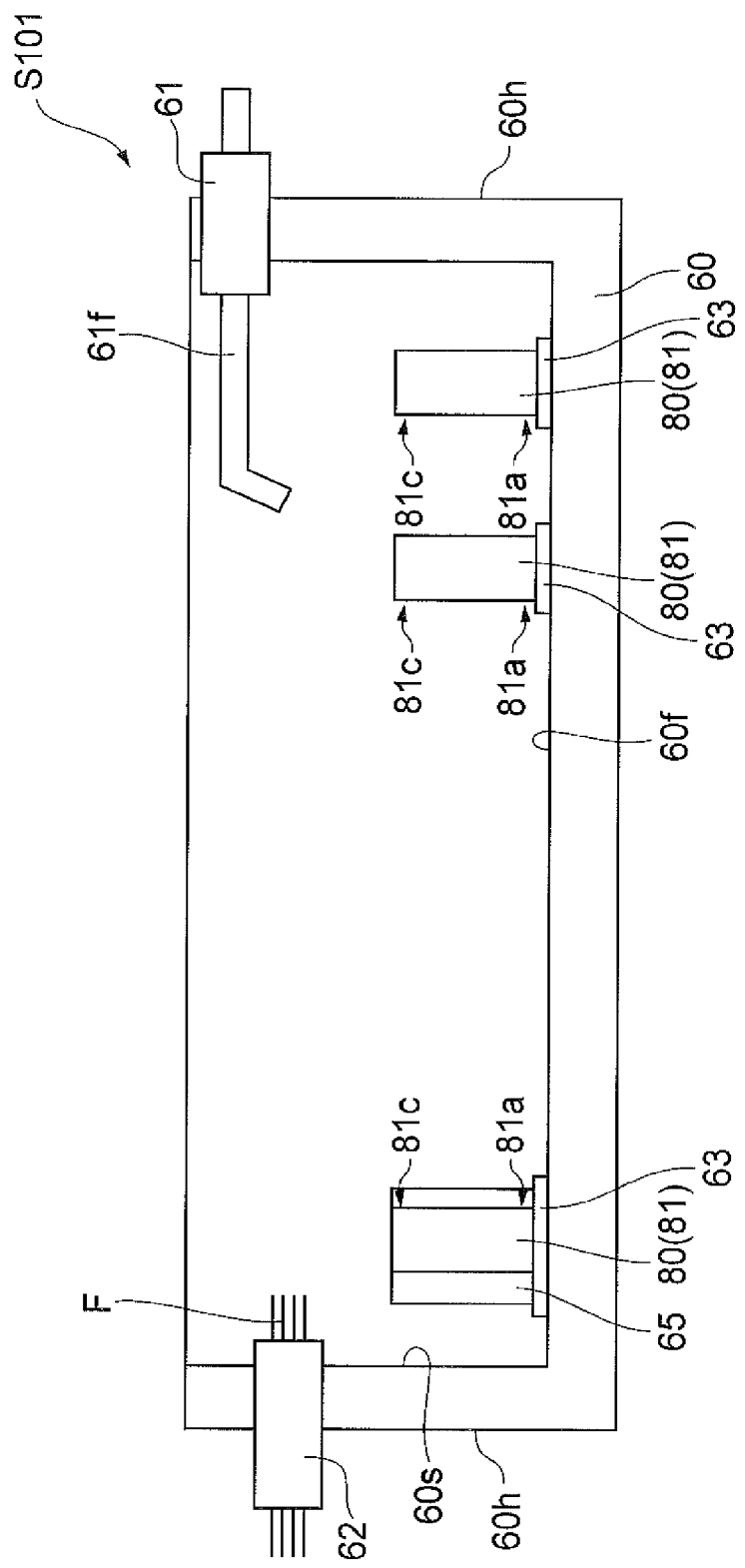
FIG. 9 is a view illustrating major steps for a method of manufacturing the optical device illustrated in FIG. 1.

Then, with reference to FIGS. 9 to 12, a method (optical device assembly method) of manufacturing the optical device 1 configured as described above will be described. In this method, first, as illustrated in FIG. 9, the enclosure 60 is prepared (Step S101).

The enclosure 60 includes the electrical feed-through 61 and the fiber feedthrough 62. The electrical feed-through 61 and the fiber feedthrough 62 are provided on a side surface 60h. Also, inside the enclosure 60, the slope 65 for drawing the plurality of optical fibers 50 from a side of the front surface 10f of the optical base 10 to a side of the rear surface 10g thereof is provided so as to be coupled to the opening 31 of the fiber tray 30 to be mounted later.

Figure 10:
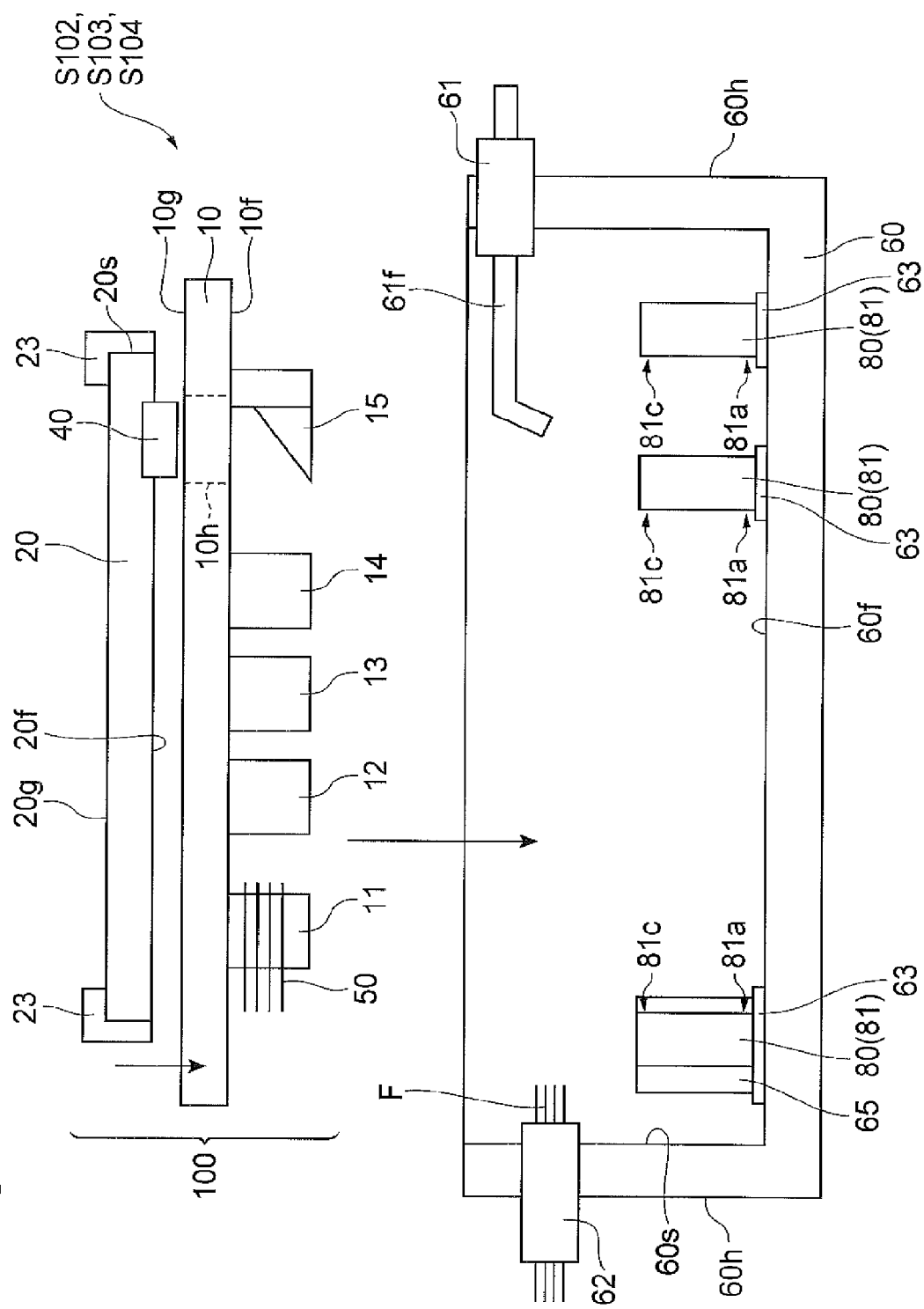
FIG. 10 is a view illustrating major steps for a method of manufacturing the optical device illustrated in FIG. 1.

Then, as illustrated in FIG. 10, the collimator array 11, the prism 12, the diffraction grating 13, the condenser lens 14, and the folding mirror 15 are mounted on the front surface 10f of the optical base 10 (Step S102). Note that the plurality of optical fibers 50 is connected to the collimator array 11.

Then, the electric board 20 mounting the electronic components and the MEMS mirror 40 thereon is fixed to the optical base 10 to form the optical unit 100 (Step S103: first step). At this time, the electric board 20 is fixed to the optical base 10 by the fixing member 23 as described above.

Then, as illustrated in FIG. 10, the one end portion 81a of the pillar 80 is fixed to the enclosure 60 to thereby attach the pillar 80 to the enclosure 60 (Step S104: first step and second step). More specifically, the flange portion 84 provided in one end portion 81a of the body member 81 of the pillar 80 is screw-fixed to each of the support pieces 63 protrudingly provided from the inner side surface 60s of the enclosure 60 to thereby fix the body member 81 to the enclosure 60. Then, the member 82 is attached to the other end portion 81c of the body member 81 attached to the enclosure 60 (first step and second step).

Then, the optical unit 100 including the MEMS mirror 40 is placed in the enclosure 60 and the optical base 10 is fixed to the enclosure 60 by the pillar 80 (Step S104: second step and third step). Thereby, the optical unit 100 is fixed to the enclosure 60. Note that when the optical unit 100 is placed in the enclosure 60, the front surface 10f of the optical base 10 is oriented to face a side of the bottom surface 60f of the enclosure 60. Thus, the optical base 10 is supported by the pillar 80 and fixed to the enclosure 60 in a state of being spaced apart from the inner surface of the enclosure 60.

Also, in this step, the optical base 10 is placed on the member 82 while the other end portion 81c of the body member 81 is inserted into the hole portion 10r of the optical base 10 (mounted in the other end portion 81c of the pillar 80). The optical base 10 is placed in the enclosure 60 so as to form the clearance C1 between the optical base 10 and the enclosure 60 in a portion having the smallest distance between the optical base 10 and the enclosure 60 in a direction along the front surface 10f.

Further, in this step, on the optical base 10, the member 83 is inserted into the other end portion 81c of the body member 81, and then the member 82 and the member 83 are screw-fixed to the other end portion 81c of the body member 81. Thereby, the optical base 10 is sandwiched between the member 82 and the member 83 to be supported by and fixed to the enclosure 60 in a state of being spaced apart from the enclosure 60. At this time, the pillar 80 holds the optical base 10 so as to form the clearance C2 between the other end portion 81c and the optical base 10 in a direction along the front surface 10f of the optical base 10. The width of the clearance C1 in a direction along the front surface 10f is preferably greater than the width of the clearance C2 in a direction along the front surface 10f.

Figure 11:
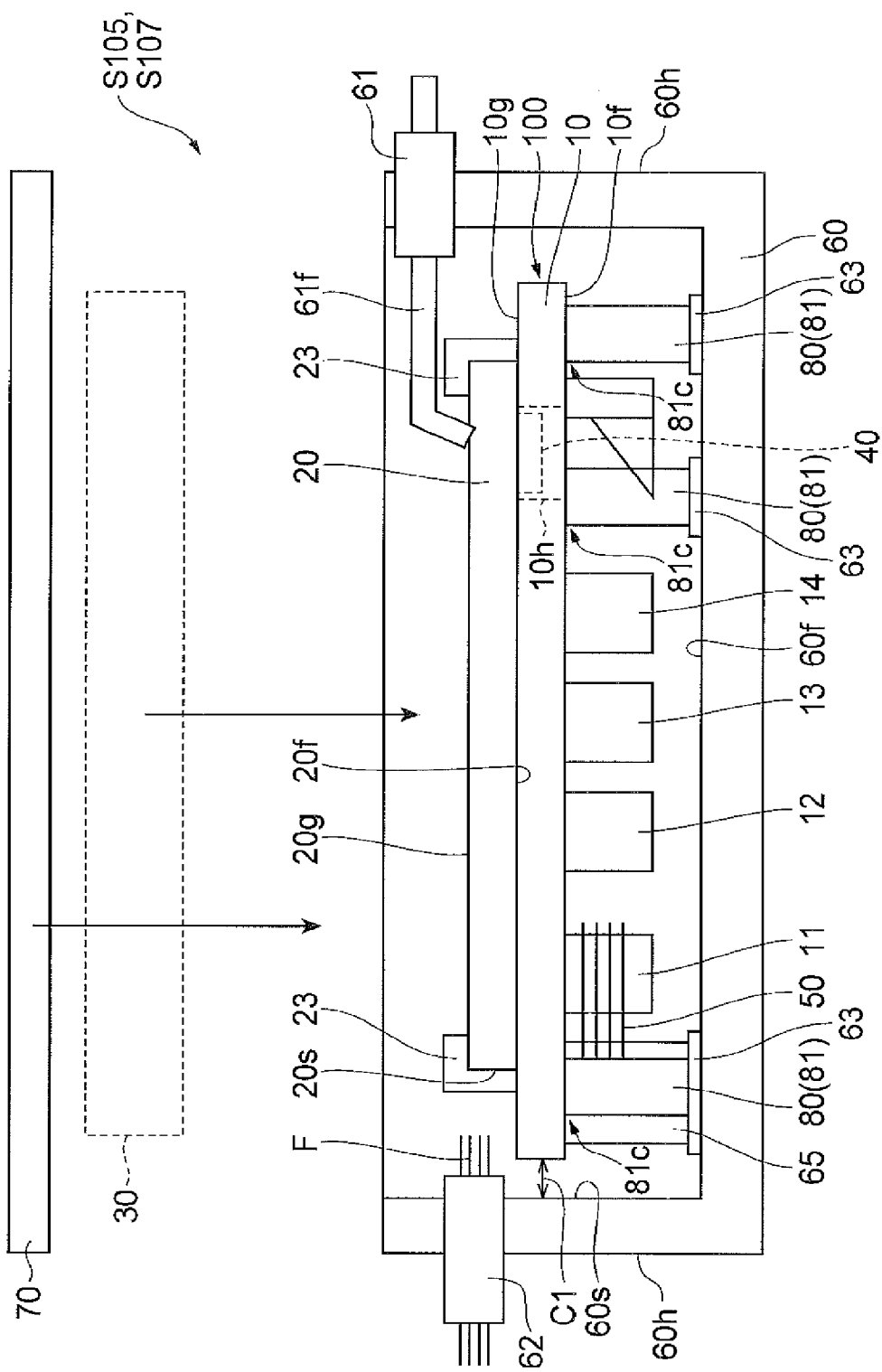
FIG. 11 is a view illustrating major steps for a method of manufacturing the optical device illustrated in FIG. 1.

Then, as illustrated in FIG. 11, the fiber tray 30 is placed in a space defined between the outer peripheral surface 20s of the electric board 20 and the inner side surface 60s of the enclosure 60 (Step S105).

Figure 12:
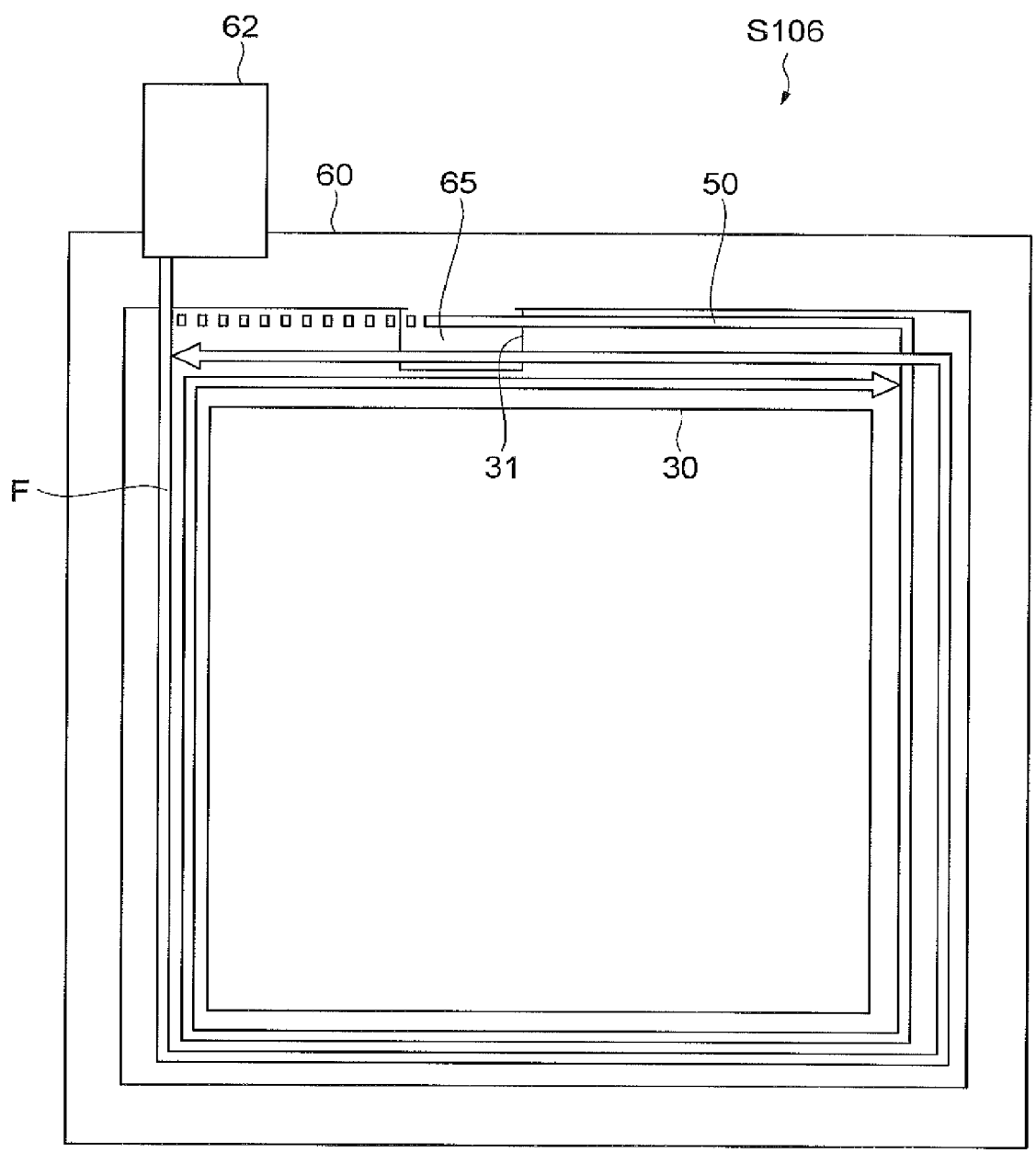
FIG. 12 is a view illustrating major steps for a method of manufacturing the optical device illustrated in FIG. 1.

Then, as illustrated in FIG. 12, the optical fiber 50 is drawn from a side of the front surface 10f of the optical base 10 into the fiber tray 30 through the slope 65 of the enclosure 60 and the opening 31 of the fiber tray 30 to be routed inside the fiber tray 30 (Step S106). At the same time, the external optical fiber F introduced from the fiber feedthrough 62 is similarly routed inside the fiber tray 30 (Step S106). At this time, the direction of routing the optical fiber 50 is reversed from the direction of routing the external optical fiber F.

Then, thus routed optical fiber 50 and external optical fiber F are fusion-spliced to each other in a predetermined position (fourth step). Then, the mutually connected optical fiber 50 and external optical fiber F are placed in the fiber tray 30 (fifth step).

Subsequently, the MEMS mirror 40 and the electrical feed-through 61 are electrically connected to each other through the electrical connection end 61f made of a flexible substrate and the drive circuit 21, and then as illustrated in FIG. 11, the lid body 70 is bonded to the enclosure 60 (for example, by laser welding or the like) to hermetically seal the inside thereof (S107), which obtains the optical device 1.

As described above, the optical device 1 includes the optical base 10, the electric board 20, the fiber tray 30, and the like, which are placed in the enclosure. In particular, the electric board 20 is made smaller than the optical base 10, and the fiber tray 30 is placed in a space defined between the outer peripheral surface 20s of the smaller electric board 20 and the inner side surface 60s of the enclosure 60. In other word, the optical device 1 uses a gap between the electric board 20 and the enclosure 60 not as a dead space but as a space for routing a remaining portion of the optical fiber. Thus, the optical device 1 can further improve space efficiency and thereby can reliably reduce its size.

Also, in the optical device 1, the optical base 10 mounting the optical components thereon are supported by the pillar 80 and fixed to the enclosure 60 so as to be spaced apart from enclosure 60 in a direction crossing the front surface 10f of the optical base 10. Thus, even if a vibration is applied to the enclosure 60, the vibration is not directly transmitted to the optical base 10 mounting the optical components thereon. Thus, the optical device 1 improves vibration resistance and also improves reliability.

Particularly in the optical device 1, the optical base 10 is sandwiched between the member 82 and the member 83 each functioning as a vibration buffer member in a direction crossing the front surface 10f of the optical base 10. Thus, the optical device 1 further improves vibration resistance in a direction crossing the front surface 10f of the optical base 10.

Also in the optical device 1, the pillar 80 is fixed to the support piece 63 protrudingly provided from the inner side surface 60s of the enclosure 60. Thus, in the optical device 1, the pillar 80 does not directly contact the bottom surface 60f and the inner side surface 60s of the enclosure 60, which further improves vibration resistance.

Also in the optical device 1, the optical base 10 is arranged so as to form the clearance C1 between the optical base 10 and the enclosure 60 in a portion having the smallest distance between the optical base 10 and the enclosure 60 in a direction along the front surface 10f. Meanwhile, the pillar 80 holds the optical base 10 so as to form the clearance C2 between the other end portion 81c and the optical base 10 in a direction along the front surface 10f of the optical base 10. The width of the clearance C1 in a direction along the front surface 10f is greater than the width of the clearance C2 in a direction along the front surface 10f. Thus, even if the position of the optical base 10 in a direction along the front surface 10f of the optical base 10 is changed due to vibration or the like, the amount of variation falls within a range of the clearance C2 between the optical base 10 and the other end portion 81c, which can prevent a contact between the optical base 10 and the enclosure 60.

As described above, the optical device 1 has a vibration isolation structure in a direction crossing the front surface 10f of the optical base 10 and in a direction along the front surface 10f. Thus, even an optical device 1 in which a plurality of inner optical fibers 50 are arranged in a direction crossing the front surface 10f of the optical base 10 and wavelength-multiplexed light is dispersed in a direction along the front surface 10f of the optical base 10 can ensure high reliability against vibration.

The above described embodiment is just an embodiment of the optical device, the method of manufacturing the optical device, and the optical device assembly method according to the present invention. Thus, the optical device, the method of manufacturing the optical device, and the optical device assembly method according to the present invention is not limited to the above embodiment. The optical device, the method of manufacturing the optical device, and the optical device assembly method according to the present invention can be assumed to include any modifications to the above embodiment within the scope not changing the spirit of each claim.

For example, in the aforementioned optical device 1, when viewed from the thickness direction of the optical base 10 and the electric board 20, the electric board 20 is smaller than the optical base 10 and the fiber tray 30 is arranged in a space defined between the outer peripheral surface 20s of the electric board 20 and the inner side surface 60s of the enclosure 60, but the size of the optical base 10 and the electric board 20 and the aspect of arrangement of the fiber tray 30 are not limited to this.

Specifically, when viewed from the thickness direction of the optical base 10 and the electric board 20, the optical base 10 may be made smaller than the electric board 20 and the fiber tray 30 may be arranged in a space defined between the outer peripheral surface of the optical base 10 and the inner side surface 60s of the enclosure 60. In other word, any one of the optical base 10 and the electric board 20 may be made smaller than the other, and the fiber tray 30 may be arranged in a space defined between the outer peripheral surface of one of the optical base and the electric board, whichever is smaller, and the inner side surface 60s of the enclosure 60.

In particular, the size of the optical base 10 and the electric board 20, whichever is larger, can be selected according to the size of the component to be mounted thereon. More specifically, like the aforementioned optical device 1, if the height of the optical component mounted on the optical base 10 (height along the thickness direction of the optical base 10 and the electric board 20) is higher than the height of the electronic component mounted on the electric board 20, the optical base 10 may be made larger than the electric board 20, while if the height of the electronic component mounted on the electric board 20 is higher than the height of the optical component mounted on the optical base 10, the electric board 20 may be made larger than the optical base 10.

In this manner, of the optical base 10 and the electric board 20, the board mounting a relatively taller component is made larger than the board mounting a relatively shorter component, which can further reduce dead space in the enclosure 60 and thereby improve space efficiency.

Also, in the optical device 1, the clearance C2 between the optical base 10 (the inner surface of the hole portion 10r) and the other end portion 81c of the body member 81 of the pillar 80 may be filled with a material softer than the material of the optical base 10 to obtain the seismic effect or another member (third elastic member) may be further arranged (filled). By further providing a member made of an elastic material in the clearance C2 in this manner, the variation in the position of the optical base 10 can be suppressed while preventing a vibration from being transmitted from the pillar 80 to the optical base 10 in a direction along the front surface 10f of the optical base 10. In particular, this member can be integrally configured with the member 82 and the member 83, which can reduce the number of components.

Also, in the optical device 1, the member 82 may be a rubber washer and the member 83 may be a disc spring, but the aspect of the members 82 and 83 is not limited to this. For example, the member 82 may be a disc spring and the member 83 may be a rubber washer, or both of the member 82 and the member 83 may be a disc spring or a rubber washer.

Also, in the above optical device 1, the MEMS mirror 40 is assumed to be mounted on the electric board 20, but the aspect of mounting the MEMS mirror 40 is not limited to this. For example, the MEMS mirror 40 may be mounted on the optical base 10 or may be mounted on another member other than the optical base 10 and the electric board 20.

Further, the light deflection element is not limited to the MEMS mirror 40, but for example, may be an element made of transmission type liquid crystal element and birefringent crystal, or any light deflection element such as an LCOS (Liquid Crystal on Silicon) and a DLP (Digital Light Processing).

Here, FIG. 13A and FIG. 13B are schematic cross-sectional views illustrating a configuration of an optical device according to a modification. As illustrated in FIG. 13A and FIG. 13B, the configuration of placing the electric board 20 in the enclosure 60 is not limited to the above embodiment. For example, as illustrated in FIG. 13A, the electric board 20 may be arranged on a side of the rear surface 10g of the optical base 10 and may be fixed to the enclosure 60 (more specifically, the lid body 70 (hereinafter the same)) by the fixing member 23. At this time, a heat dissipation sheet 90 is preferably interposed between the electric board 20 and the enclosure 60 This configuration can release heat generated by an electronic component (such as the drive circuit 21) 25 mounted on the electric board 20 to a side of the enclosure 60 in a direction opposite to the optical base 10. Thus, this configuration can prevent an excessive rise in temperature of the optical component mounted on the optical base 10. Note that here the optical base 10 is placed in the enclosure 60 in such a manner that the front surface 10f faces a side of the bottom surface 60f of the enclosure 60. Note also that here the electric board 20 is placed in the enclosure 60 in such a manner that the front surface 20f faces a side opposite to the bottom surface 60f of the enclosure 60 (an open portion side of the enclosure 60, that is, a side of the lid body 70).

Also as illustrated in FIG. 13B, the electric board 20 may be arranged on a side of the front surface 10f of the optical base 10 and may be fixed to the enclosure 60 by the fixing member 23. At this time, a heat dissipation sheet 90 is preferably interposed between the electric board 20 and the enclosure 60. This configuration can release heat generated by an electronic component (such as the drive circuit 21) mounted on the electric board 20 to a side of the enclosure 60 in a direction opposite to the optical base 10. Thus, this configuration can prevent an excessive rise in temperature of the optical component mounted on the optical base 10. Note that here the optical base 10 is placed in the enclosure 60 in such a manner that the front surface 10f thereof faces a side opposite to the bottom surface 60f of the enclosure 60. Note also that the electric board 20 is also placed in the enclosure 60 in such a manner that the front surface 20f thereof faces a side opposite to the bottom surface 60f of the enclosure 60.

In other word, in the optical device 1, the optical base 10 and the electric board 20 can be placed in the enclosure 60 in any direction. In addition, the fixing member 23 may be assumed to not only fix the electric board 20 and the optical base 10 to each other but also fix the electric board 20 and the enclosure 60 to each other. Note that in the modifications illustrated in FIG. 13A and FIG. 13B, the MEMS mirror 40 is mounted on the front surface 10f of the optical base 10 and is electrically connected to the electric board 20 through an electrical wiring 95 such as an FPC.

There follow appendices related to the above embodiments.

Appendix 1

An optical unit comprising:
an optical base mounting an optical component on a front surface thereof;
an enclosure placing the optical base therein; and
a support body supporting and fixing the optical base to the enclosure, wherein
the optical base is supported and fixed by the support body so as to be spaced apart from the enclosure in a direction crossing the front surface.

Appendix 2

The optical unit according to appendix 1, wherein
the support body has one end portion fixed to the enclosure and the other end portion fixed to the optical base; and
the optical base is held in the other end portion of the support body along a direction crossing of the front surface.

Appendix 3

The optical unit according to appendix 2, wherein
the optical base is arranged so as to form a first clearance between the optical base and the enclosure in a portion having the smallest distance between the optical base and the enclosure, in a direction along the front surface;
the support body holds the optical base so as to form a second clearance between the other end portion and the optical base, in a direction along the surface; and a width of the first clearance in a direction along the front surface is greater than the width of the second clearance in a direction along the front surface.

Appendix 4

The optical unit according to appendix 2 or 3, wherein the optical base is sandwiched between a first elastic member and a second elastic member attached to the other end portion of the support body.

Appendix 5

The optical unit according to any one of appendices 2 to 4, wherein the support body is formed in a columnar shape in which a center of the one end portion matches the center of the other end portion thereof.

Appendix 6

The optical unit according to appendix 4, wherein the first elastic member and the second elastic member are a disc spring or a rubber washer respectively.

Appendix 7

The optical unit according to any one of appendices 2 to 6, wherein the one end portion of the support body is fixed to the enclosure through a support piece protrudingly provided from an inner side surface of the enclosure.

Appendix 8

The optical unit according to any one of appendices 2 to 7, wherein a third elastic member is arranged between the optical base and the other end portion of the support body in a direction along the front surface.

Appendix 9

The optical unit according to appendix 8, wherein the third elastic member is integrally configured with at least one of the first elastic member and the second elastic member.

Appendix 10

An optical device comprising:
the optical unit according to any one of appendices 1 to 9 and
an optical engine placed in the enclosure, wherein
the optical component includes input and output ports configured by arranging of a plurality of optical fibers including an input port for inputting wavelength-multiplexed light and an output port for outputting light in a direction crossing the front surface; and a dispersive element that disperses the wavelength-multiplexed light inputted from the input port for each predetermined wavelength component in a direction along the surface and emits light; and
the optical engine is a light deflection element that deflects light emitted from the dispersive element toward the output port predetermined according to the wavelength component.

In the optical unit according to appendix 1, the optical base mounting the optical component is spaced apart from the enclosure in a direction crossing the front surface of the optical base by the support body. Thus, even if a vibration is applied to the enclosure, the vibration is not directly transmitted to the optical base mounting the optical component.

Thus, this optical unit improves vibration resistance. The optical unit according to appendix 2 not only can improve vibration resistance but also can reliably fix the optical base to the support body and the enclosure.

According to the optical unit according to appendix 3, even if the position of the optical base in a direction along the front surface of the optical base is changed due to vibration or the like, the amount of variation falls within a range of the second clearance between the optical base and the support body, which can prevent a contact between the optical base and the enclosure. According to the optical unit according to appendix 4, the first and second elastic members function as a vibration buffer member, which further improves vibration resistance.

According to the optical unit according to appendix 5, even if the support body is rotated around the matched center, the positional relation between the one end portion and the other end portion is not changed, and thus the positional relation between the support body and the optical base can be easily adjusted at assembly. According to the optical unit according to appendix 6, the optical base can be easily held and fixed in a direction crossing the front surface of the optical base in the other end portion of the support body. According to the optical unit according to appendix 7, the support body and the enclosure can be easily positioned.

According to the optical unit according to appendix 8, the variation in the position of the optical base can be suppressed while preventing a vibration from being transmitted from the support body to the optical base in a direction along the front surface of the optical base. According to the optical unit according to appendix 9, the number of components can be reduced. The optical device according to appendix 10 is an optical device in which a plurality of optical fibers is arranged in a direction crossing the front surface of the optical base and disperses wavelength-multiplexed light in a direction along the front surface of the optical base; and has a vibration isolation structure in a direction crossing the front surface of the optical base and in a direction along the front surface, thereby improving vibration resistance and also improving reliability.

What is claimed is:

1. An optical device comprising:
   an optical unit having an optical base mounting an optical component on a front surface thereof, and an electric board fixed on a rear surface of the optical base by a plurality of fixing members and mounting an electronic component thereon;
   an enclosure placing the optical unit therein;
   a fiber tray placing a plurality of optical fibers optically connected to the optical component therein; and
   a pillar extending from the enclosure to the optical base for supporting the optical base to the enclosure so as to be spaced apart from each other,
   wherein one of the optical base and the electric board is smaller than the other when viewed from a predetermined direction along a thickness direction of the optical base and the electric board; and
   the fiber tray is disposed in a space defined by an outer peripheral surface of a smaller one of the optical base and the electric board, and an inner surface of the enclosure so as to surround the smaller one.

2. The optical device according to claim 1, wherein if a height of the optical component in the predetermined direction is higher than a height of the electronic component, the optical base is larger than the electric board; and
   if the height of the electronic component in the predetermined direction is higher than the height of the optical component, the electric board is larger than the optical base.

3. An optical device comprising:
   an optical unit having an optical base mounting an optical component on a front surface thereof, and an electric board disposed on the front surface side of the optical base or a rear surface side of the optical base and mounting an electronic component thereon;
   an enclosure placing the optical unit therein;
   a plurality of fixing members fixing the electric board to the optical base or the enclosure; and
   a pillar extending from the enclosure only to the front surface of the optical base for supporting the optical base to the enclosure so as to be spaced apart from each other,
   wherein the front surface of the optical base faces a bottom side of the enclosure.

4. An optical device comprising:
   an optical unit having an optical base mounting an optical component on a front surface thereof, and an electric board disposed on the front surface side of the optical base or a rear surface side of the optical base and mounting an electronic component thereon;
   an enclosure placing the optical unit therein;
   a plurality of fixing members fixing the electric board to the optical base or the enclosure; and
   a pillar including one end portion fixed to the enclosure and the other end portion fixed to the optical base, and extending from the enclosure to the optical base for supporting the optical base to the enclosure so as to be spaced apart from each other,
   wherein the optical base is sandwiched between a first elastic member and a second elastic member attached to the other end portion of the pillar;
   a third elastic member is interposed between the optical base and the other end portion of the pillar in a direction along the front surface; and
   the first elastic member, the second elastic member, and the third elastic member are integrally configured.

5. The optical device according to claim 4,
   wherein the optical base is arranged so as to form a first clearance between the optical base and the enclosure in a direction along the front surface;
   the pillar holds the optical base so as to form a second clearance between the other end portion and the optical base, in a direction along the front surface;
   a width of the first clearance in a direction along the front surface is greater than the width of the second clearance in a direction along the front surface; and
   the third elastic member is interposed at the second clearance.

6. The optical device according to claim 4, wherein the pillar is formed in a columnar shape in which a center of the one end portion matches the center of the other end portion.

7. The optical device according to claim 4, wherein the one end portion of the pillar is fixed to the enclosure through a support piece protrudingly provided on an inner side surface of the enclosure.

8. The optical device according to claim 1, wherein
   the plurality of optical fibers includes an input port for inputting light into the enclosure and an output port for outputting light from the enclosure;
   the optical component includes a collimator array that collimates light inputted from the input port;
   the electronic component includes a light deflection element that deflects light emitted from the collimator array and emits light to the output port, and a drive circuit for driving the light deflection element;

the light deflection element is placed in a frame body; and the frame body is fixed to the optical base and the electric board for fixing the electric board and the optical base to each other.

9. The optical device according to claim 1, wherein the fiber tray includes an opening for drawing the plurality of optical fibers from the front surface side of the optical base to the rear surface side of the optical base.

10. The optical device according to claim 1, wherein
the optical base and the electric board have a substantially rectangular plate shape;
the fixing members are arranged in four corners of the optical base and the electric board; and
the pillar is adjacently arranged to at least three of the fixing members.

11. The optical device according to claim 3, wherein the electric board is fixed on a rear surface of the optical base by the plurality of fixing members.

12. The optical device according to claim 11, further comprising a fiber tray placing a plurality of optical fibers optically connected to the optical component therein, and
wherein the electric board is smaller than the optical base when viewed from a predetermined direction along a thickness direction of the optical base and the electric board; and
the fiber tray is disposed in a space defined by an outer peripheral surface of the electric board, and an inner surface of the enclosure.

* * * * *